US007201340B2

(12) United States Patent
Dietrich et al.

(10) Patent No.: US 7,201,340 B2
(45) Date of Patent: Apr. 10, 2007

(54) METHOD AND DEVICE FOR TREATING ARTICLES IN THE FORM OF SHEET-LIKE MATERIAL

(75) Inventors: Helmut Dietrich, Aschheim (DE); Michael Fiedler, München (DE)

(73) Assignee: Giesecke & Devrient GmbH, Munich (DE)

( * ) Notice: Subject to any disclaimer, the term of this patent is extended or adjusted under 35 U.S.C. 154(b) by 123 days.

(21) Appl. No.: 10/398,282

(22) PCT Filed: Oct. 10, 2001

(86) PCT No.: PCT/EP01/11723

§ 371 (c)(1), (2), (4) Date: Aug. 7, 2003

(87) PCT Pub. No.: WO02/31779

PCT Pub. Date: Apr. 18, 2002

(65) Prior Publication Data

US 2004/0039479 A1 Feb. 26, 2004

(30) Foreign Application Priority Data

Oct. 12, 2000 (DE) ................................ 100 50 486

(51) Int. Cl.
*B02C 18/22* (2006.01)
*G06K 9/00* (2006.01)

(52) U.S. Cl. .................... 241/101.2; 241/236; 382/135

(58) Field of Classification Search ............ 241/101.2, 241/236; 382/135
See application file for complete search history.

(56) References Cited

U.S. PATENT DOCUMENTS 3,634,618 A * 1/1972 Von Der Ohe ................ 386/46
4,213,189 A * 7/1980 Mueller et al. ............. 345/551

(Continued)

FOREIGN PATENT DOCUMENTS

DE 27 60 269 C2 1/1979

(Continued)

*Primary Examiner*—Lowell A. Larson
*Assistant Examiner*—Jason Y Pahng
(74) *Attorney, Agent, or Firm*—Bacon & Thomas, PLLC

(57) ABSTRACT

The invention relates to an apparatus and corresponding method for processing, i.e. testing, sorting and/or destroying, sheet material, in particular bank notes, comprising a processing device (10) having at least one means (13, 14, 41) for generating information on the processing of individual sheets (12) of sheet material, and at least one monitoring device (20) having at least one memory device (21) for storing the information on the processing of individual sheets (12).

Figure 1:
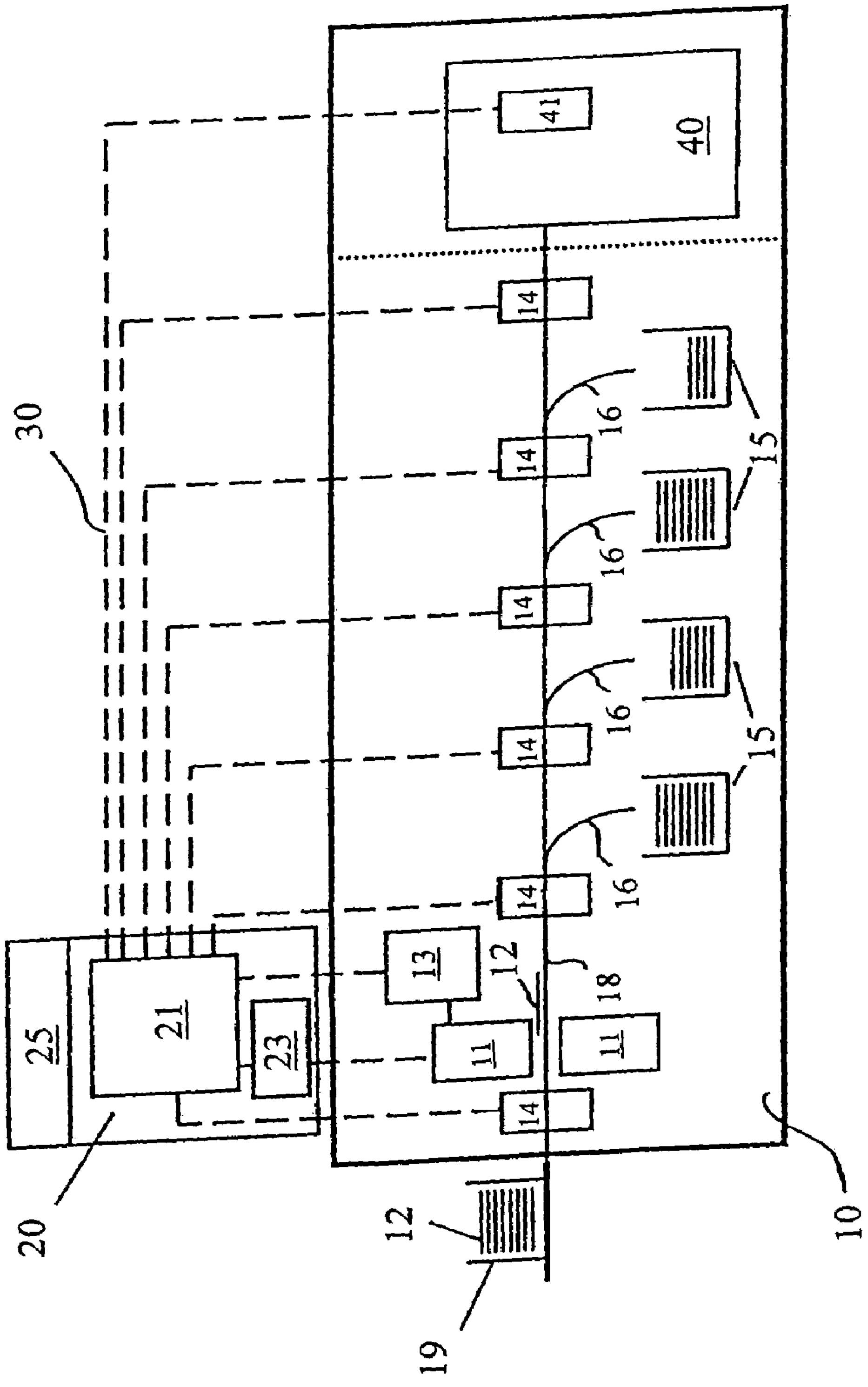

To improve the monitoring of sheet processing, in particular in regard to disturbances in the course of processing, it is provided that the processing device (10) has at least one means (11) for detecting the identity of individual sheets (12) of sheet material and the memory device (21) of the monitoring device (20) is formed for storing the information on the processing of individual sheets (12) together with the identity of the individual sheets (12).

10 Claims, 1 Drawing Sheet

U.S. PATENT DOCUMENTS

| | | | | |
|---|---|---|---|---|
| 4,346,851 | A * | 8/1982 | Bernardi et al. | 241/159 |
| 5,039,020 | A * | 8/1991 | Leuthold et al. | 241/30 |
| 5,774,377 | A | 6/1998 | Eidson et al. | |
| 6,074,081 | A | 6/2000 | Smith et al. | |
| 6,351,552 | B1 * | 2/2002 | Weaver et al. | 382/135 |
| 6,473,194 | B1 * | 10/2002 | Sakai | 358/1.17 |
| 2004/0112998 | A1 * | 6/2004 | Schmidt et al. | 241/30 |

FOREIGN PATENT DOCUMENTS

| | | | |
|---|---|---|---|
| DE | 298 17 253 | U | 2/1999 |
| EP | 0 374 481 | A2 | 6/1990 |
| EP | 0 612 042 | A2 | 8/1994 |
| EP | 1 122 696 | A | 8/2001 |

* cited by examiner

METHOD AND DEVICE FOR TREATING ARTICLES IN THE FORM OF SHEET-LIKE MATERIAL

BACKGROUND

This invention relates to an apparatus for processing sheet material, in particular bank notes, comprising a processing device having at least one means for generating information on the processing of individual sheets of sheet material, and at least one monitoring device having at least one memory device for storing the information on the processing of individual sheets. Furthermore, the invention relates to a corresponding method for processing sheet material wherein individual sheets of sheet material are processed in a processing device whereby information on the processing of individual sheets is generated and stored in a monitoring device.

Generic apparatuses and methods are used in particular in the testing, sorting and possibly destruction of bank notes. Notes are removed individually from a stack, tested for authenticity and/or fitness according to different criteria, assigned to certain sorting classes in accordance with the result of this testing, and finally supplied to corresponding output devices via a transport system. Damaged or poor-quality bank notes that are unfit for further circulation are passed to a device for demonetizing or destruction.

European patent EP 0 374 481 B1 describes a bank note processing machine in which the destruction of unfit bank notes is monitored by storing e.g. the number, length or quality of destroyed bank notes. In the method for checking the processing of bank notes disclosed in European patent EP 0 453 930 B1, the sums of bank notes deposited in different categories or shredded are furthermore recorded and printed out besides information on date, time, machine and user.

The reliability of monitoring of bank note processing in such machines reaches its limits, however, when disturbances occur in the course of processing, for example due to a crash of the system control. In such cases it might be impossible to reconstruct which notes have been outputted to the individual output devices or actually passed to the destruction device and duly destroyed. To guarantee reliable monitoring of processing, such cases require either a manual check of outputted notes or a repetition of the processing operation. This is impossible for notes already destroyed, however.

SUMMARY

It is the problem of the present invention to state an apparatus and method that permit improved monitoring of the processing of sheet material, in particular in regard to disturbances in the course of processing.

According to the invention, the processing device has at least one means for detecting the identity of individual sheets. In addition, the monitoring device includes at least one memory device for storing information on the processing of individual sheets together with the identity of the individual sheets.

The inventive storage of information on processing together with the identity of individual sheets obtains a unique association of a processed individual sheet with the information generated during processing of said sheet, for example data on authenticity or fitness testing, sorting, demonetizing or destruction. In the case of disturbances or other processing problems, it can be determined from the totality or at least part of the information stored on the processing of individual sheets in what way processing was effected on individual sheets, in particular which sheets were sorted and outputted to which output pockets or which sheets were actually demonetized or destroyed. This fundamentally permits the course of processing to be reconstructed completely or at least partly. Altogether, the association, by means of storage, of information on the processing of individual sheets with their particular identity obtains an improved monitoring of the course of processing, in particular in regard to disturbances.

The identity of individual sheets is preferably given by image data of the particular sheets. This is, for example, a picture of a printed sheet taken by a CCD camera. Additionally or alternatively, in particular in the case of bank notes, the identity of a sheet can be given by its serial number. Acquisition of the image data and/or serial number permits the identity of a printed sheet or bank note to be uniquely detected. However, the identity of sheets can fundamentally also be given by other properties or features, for example magnetic features or acoustic properties of the sheets.

In an advantageous development of the invention it is provided that galvanically decoupled connections are provided between the processing device in which information is generated on the processing of individual sheets and their particular identity is detected, and the monitoring device in which information on processing is stored together with the identity of individual sheets. The information on the processing of individual sheets and data on the identity of individual sheets are transferred over the galvanically decoupled connections. Preferably, these connections are realized by optical waveguides or optocouplers. The latter can fundamentally also be produced on the basis of high-frequency or infrared radiation. In this case a corresponding connection is realized by providing suitable transceiver pairs. Galvanic decoupling of the monitoring device from the processing device eliminates transfer of any electric disturbances from processing device to monitoring device, and possibly vice versa.

In a further preferred embodiment of the invention it is provided that the monitoring device has an energy supply device independent of the processing device. This guarantees that the information on processing stored in the monitoring device together with the identity of individual sheets is retained even if the control system crashes in the processing device or its power supply fails. The independent energy supply device can be for example suitable accumulators or an emergency power generator.

DESCRIPTION OF VARIOUS EMBODIMENTS

The invention will be explained in more detail in the following with reference to a FIGURE.

The FIGURE shows the greatly schematized structure of processing device 10 for sheet material, in particular bank notes. Bank notes 12 provided in at least one input pocket 19 are drawn in individually by suitable singling devices (not shown) and transported along transport path 18. They run through sensor system 11 that detects the identity of individual bank notes 12, among other things. Identity can be detected by taking pictures, e.g. by means of a CCD camera, of individual bank notes 12. In addition, sensor system 11 detects further properties and features of bank notes 12 to be processed, which are used for testing authenticity, degree of soiling or fitness and the the type, in particular denomination, of bank notes 12. The detected features and properties of bank notes 12 to be processed are evaluated in system control 13. In accordance with the result of this evaluation, individual diverters 16 are driven so that processed bank notes are outputted to individual output devices 15.

In case the testing of degree of soiling or fitness of a bank note indicates that it is unfit for further use, it can be supplied to converting device 40 for demonetizing or destruction, in particular shredding. Converting device 40 is integrated in processing device 10 itself, as shown by way of example in the FIGURE. However, it is fundamentally also possible to dispose converting device 40 spatially separate from processing device 10.

Besides system control 13, further means 14, 41 are provided for generating information on processing, i.e. testing, sorting or converting, of individual bank notes 12. Means 14 can be for example light barriers that register the run of notes 12 through certain points of transport path 18. In case converting device 40 is disposed spatially separate from processing device 10, one or more light barriers 14 can be mounted in the entrance area of notes 12 to converting device 40 for monitoring the entry of notes 12. Means 41 are preferably a (for example acoustic, optical or piezoelectric) sensor device for checking demonetizing or destruction of individual sheets 12.

Information on processing of individual notes 12 that is generated by means 13, 14, 41 is transferred to monitoring device 20 and stored in memory device 21 there according to the invention with data on the identity of individual notes 12 likewise transferred to monitoring device 20. Identity data are preferably a digital image and/or the serial number of note 12. Memory device 21 can be a volatile or nonvolatile storage medium or a combination of the two. Thus, the data, e.g. serial numbers or image data and clock signals or times of light barrier events, for a certain number of last processed notes 12, e.g. one million, can be stored in the working memory of a computer and written to a hard disk of the computer e.g. only in case of a disturbance during processing.

System control 13 can in addition transfer general information on processing operations to monitoring unit 20, for example the beginning and/or end of a series of processing operations, such as beginning and end of a shift in the case of multiple shift operation of the machine, or the name or an identification feature of an operator.

Additionally a clock signal can be transferred by system control 13 to monitoring device 20 and stored there in memory device 21 together with the information on processing of notes 12. Instead of the clock signal itself, time values derived therefrom can also be stored. The machine cycle given by system control 13 realizes an "internal clock," the status of light barriers 14 being queried at each cycle. In case at least one state has changed at light barriers 14, the new state is stored together with the internal time. This method permits only changes of the state detected in particular light barriers 14 to be recorded. Corresponding evaluation of light barrier events stored for individual cycle times finally makes it possible to retrace the path of note 12 through processing device 10.

According to the invention it is provided that connections 30 between processing device 10 and monitoring device 20—that are shown by dashed lines in the FIGURE—are galvanically decoupled connections. Independent energy supply device 25 additionally decouples monitoring device 20 from the energy supply of processing device 10. It is thus ensured that data generated and stored during the processing operation are maintained even in case of power failure or a crash of system control 13 of processing device 10.

In the shown example, monitoring device 20 additionally has evaluation device 23 in which the serial number of individual notes 12 is determined from the image data of individual notes 12 detected in processing device 10 and transferred to monitoring device 20. This can be effected for example by suitable OCR (optical character recognition) software. Additionally or alternatively, the serial number can be determined in system control 13 of processing device 10 and transferred to monitoring device 20 for storage. In case it is impossible to determine the serial number due to a heavily soiled printed image or greatly damaged note 12, the image data of note 12 are stored, instead of the serial number, in memory device 21 together with the information on processing of said note.

In the shown example, monitoring device 20 is disposed spatially separate from processing device 10. However, it is fundamentally also possible to integrate monitoring device 20 spatially in processing device 10.

The invention claimed is:

1. In an apparatus for processing bank notes, including a bank note processing device having at least one means for generating information on the processing of individual bank notes, said means for generating information comprising at least one light barrier; and at least one monitoring device having at least one memory device for storing the generated information on the processing of the individual bank notes, and wherein the bank note processing device has at least one means for detecting the identity of the individual bank notes, and the memory device of the monitoring device is formed for storing the generated information on the processing of the individual bank notes together with the identity of the individual bank notes, the improvement comprising galvanically decoupled connections comprising optical waveguides or optocouplers provided between the processing device and the monitoring device for transferring the identity of the individual bank notes from the bank note processing device to the monitoring device and at least one of said galvanically decoupled connections arranged at least between the at least one light barrier and the monitoring device for transferring the generated information on the processing of the individual bank notes from the bank note processing device to the monitoring device.

2. The improvement according to claim 1, wherein the bank note processing device has at least one converting device for demonetizing or destroying particular individual bank notes.

3. The improvement according to claim 2, wherein the converting device has means for checking the demonetizing or destruction of the particular individual bank notes.

4. The improvement according to claim 1, wherein the bank note processing device has one or more output devices to which particular individual bank notes are outputted.

5. The improvement according to claim 1, wherein the means for generating information on the processing of individual bank notes includes at least one sensor for registering particular bank notes outputted to an output device or transferred to a converting device.

6. The improvement according to claim 1, wherein the monitoring device has an energy supply device independent of the bank note processing device.

7. The improvement according to claim 1, wherein the monitoring device is arranged to receive a clock signal and to store the generated information on processing together with the clock signal and/or values derived from the clock signal.

8. The improvement according to claim 1, wherein the identity of at least one bank note is provided by image data and/or a serial number of the at least one bank note.

9. The improvement according to claim 8, wherein the monitoring device has an evaluation device for determining the serial number of the at least one bank note from the image data of the at least one bank note.

10. The improvement according to claim 1, wherein the memory device has a volatile and/or nonvolatile storage medium.

* * * * *